US008584494B2

(12) United States Patent
Salvatore et al.

(10) Patent No.: US 8,584,494 B2
(45) Date of Patent: Nov. 19, 2013

(54) ANTI-LIGATURE DOOR HARDWARE

(75) Inventors: Ronald Salvatore, Stamford, CT (US); Rodd Salvatore, Stamford, CT (US); Francis Colligan, New Haven, CT (US)

(73) Assignee: Accurate Lock and Hardware Co., LLC, Stamford, CT (US)

( * ) Notice: Subject to any disclaimer, the term of this patent is extended or adjusted under 35 U.S.C. 154(b) by 451 days.

(21) Appl. No.: 12/855,254

(22) Filed: Aug. 12, 2010

(65) Prior Publication Data

US 2011/0174026 A1 Jul. 21, 2011

Related U.S. Application Data

(60) Provisional application No. 61/297,048, filed on Jan. 21, 2010.

(51) Int. Cl.
*B60R 25/02* (2013.01)

(52) U.S. Cl.
USPC ....... 70/210; 70/91; 292/336.3; 292/DIG. 65; 49/502; 16/414

(58) Field of Classification Search
USPC .................. 70/91, 208–210; 292/336.3, 347, 292/DIG. 31, DIG. 65; 16/414; 49/502
See application file for complete search history.

(56) References Cited

U.S. PATENT DOCUMENTS

| | | | | | |
|---|---|---|---|---|---|
| 1,434,370 | A | * | 11/1922 | Crompton | 292/163 |
| D114,315 | S | * | 4/1939 | Brodbeck | D8/311 |
| 3,038,757 | A | * | 6/1962 | Schulze | 296/153 |
| 3,713,683 | A | | 1/1973 | Neary | |
| 4,064,721 | A | | 12/1977 | Morgan | |
| 4,492,394 | A | * | 1/1985 | Dignan | 292/64 |
| 4,575,141 | A | | 3/1986 | Burns | |
| 5,303,965 | A | * | 4/1994 | Meehan | 292/336.3 |
| 5,797,286 | A | * | 8/1998 | Armstrong | 70/224 |
| 6,460,906 | B2 | * | 10/2002 | Bingle et al. | 292/336.3 |
| 7,373,694 | B1 | | 5/2008 | Kopp | |
| 7,617,707 | B2 | * | 11/2009 | Chiang | 70/89 |
| 7,802,828 | B2 | * | 9/2010 | Hopkins et al. | 292/288 |
| 8,052,182 | B1 | * | 11/2011 | Weinerman et al. | 292/336.3 |
| 8,122,745 | B2 | * | 2/2012 | Ramsauer et al. | 70/224 |
| 2003/0150247 | A1 | * | 8/2003 | Talpe | 70/210 |
| 2010/0013248 | A1 | | 1/2010 | Keller | |
| 2010/0072762 | A1 | * | 3/2010 | Marks | 292/336.3 |
| 2010/0126239 | A1 | * | 5/2010 | Berger | 70/92 |
| 2010/0327611 | A1 | * | 12/2010 | Rees | 292/336.3 |
| 2011/0120024 | A1 | * | 5/2011 | Shilts | 49/506 |

* cited by examiner

*Primary Examiner* — Suzanne Barrett
(74) *Attorney, Agent, or Firm* — St. Ogne Steward Johnston & Reens LLC

(57) ABSTRACT

A door handle has an elongated member pivotally connected with a plate member. The elongated member has a toe portion which interacts with the plate member. In this way, the elongated member is at least partially retained by the plate member at each end. The door handle provides an anti-ligature design that thwarts suicide attempts by persons attempting to affix or hang ligatures on the door handle. The door handle is also easily operable by those with disabilities.

33 Claims, 5 Drawing Sheets

ANTI-LIGATURE DOOR HARDWARE

CROSS-REFERENCE TO RELATED APPLICATIONS

This patent application claims the benefit, under 35 U.S.C. §119(e), of U.S. Provisional Patent Application Ser. No. 61/297,048, filed on Jan. 21, 2010, the content of which is incorporated herein by reference.

FIELD OF THE INVENTION

The present teachings relate generally to door hardware, such as that which is used to operate door locks, latches and/or deadbolts, although not limited thereto. More specifically, the present teachings relate to door hardware that is anti-ligature in that it is difficult for ropes, cords, wires, articles of clothing or other pieces of material (hereinafter referred to as "ligatures") to be tied or looped around the door hardware, whether intentionally or unintentionally, to cause harm to persons having access thereto.

BACKGROUND OF THE INVENTION

In many environments such as, for example, although not limited thereto, medical facilities, schools, offices, government buildings, residences, and other institutions, there exists a population of people at risk of committing suicide. In many psychiatric hospitals, for example, patients have been known to attempt suicide, specifically hanging, while in the care of the institution.

These suicide attempts are known to have involved the use of doorknobs and other door hardware. To attempt suicide, a person may wrap a ligature such as a belt, although not limited thereto, around a doorknob in order to hang him- or herself. Institutions have many private rooms where such a suicide attempt may take place, such as bathrooms. Every private room cannot be watched at the same time without enormous staff resources. Therefore, private rooms, and specifically door hardware, provide an area of opportunity for a suicide attempt.

The problem of suicide attempts has been addressed in many institutions by simply removing all door hardware, and even the doors themselves. While this may reduce the opportunity for suicide attempts, it likewise eliminates all privacy and security.

Some current designs for anti-suicide door hardware have included flush-mounting, low profiles, and steep angles to inhibit the affixing of a ligature. However, these known designs fail to fully inhibit the ability of a person to use door hardware for attempting suicide. Furthermore, in an attempt to make the door hardware difficult to use for the purpose of attempting suicide, known designs have made normal operation of the door hardware difficult.

Therefore, it would be beneficial to have a superior system and method for use of anti-ligature door hardware.

SUMMARY OF THE INVENTION

The needs set forth herein as well as further and other needs and advantages are addressed by the present embodiments, which illustrate solutions and advantages described below.

The system of the present embodiment includes, but is not limited to, door hardware comprising an elongated member having a first end, a second end, and a pivot point substantially near its first end. A plate member is in pivotal connection with the pivot point of the elongated member such that the plate member and elongated member are substantially close to one another to inhibit a ligature from being inserted therebetween. The plate member has a retaining member for retaining the second end of the elongated member and is adapted for fastening substantially close to a door to inhibit a ligature from being inserted therebetween. The door hardware is operable by pivoting the door hardware about its pivot point to operate a locking mechanism and the elongated member has a tapered profile to inhibit ligatures from hanging thereon. The pivotal connection between the elongated member and the plate member and the retaining member retaining the second end of the elongated member inhibit ligatures from being slipped between the elongated member and the plate member.

Other embodiments of the door hardware and method of use are described in detail below and are also part of the present teachings.

For a better understanding of the present embodiments, together with other and further aspects thereof, reference is made to the accompanying drawings and detailed description, and its scope will be pointed out in the appended claims.

DETAILED DESCRIPTION OF THE INVENTION

The present teachings are described more fully hereinafter with reference to the accompanying drawings, in which the present embodiments are shown. The following description is presented for illustrative purposes only and the present teachings should not be limited to these embodiments.

In one embodiment of the door hardware, an anti-ligature door handle according to the present teachings comprises an elongated member, which may be crescent-shaped, and which is tapered to thwart its use as a means for affixing or hanging a ligature. The door handle may have a toe and be in pivotal connection with a plate member which has a toe track for receiving the toe of the elongated member. So constructed, the door handle both inhibits suicide attempts and yet remains easily operable, which may benefit, for example, those with disabilities.

Figure 1A:
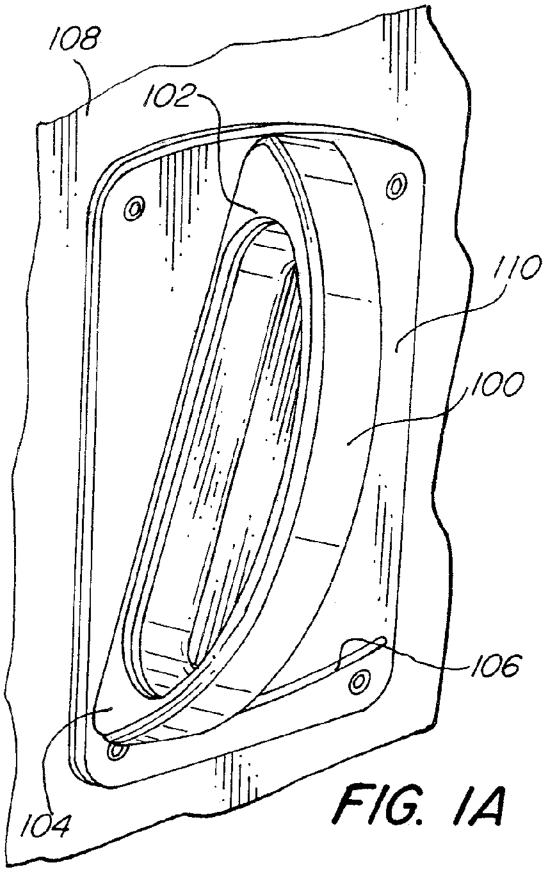
FIGS. 1A, 1B and 1C are illustrations of one embodiment of a door handle according to the present teachings.
Figure 1B:
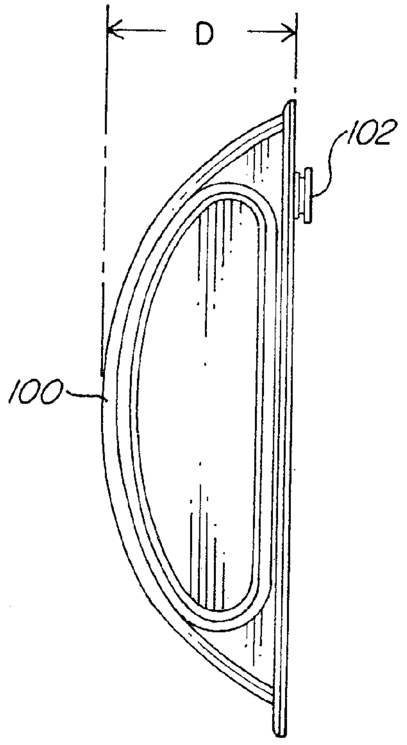
Figure 1C:
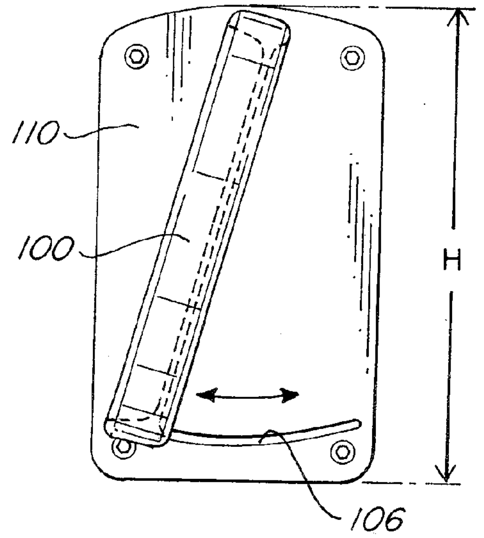

Referring now to FIGS. 1A, 1B and 1C, shown are illustrations of one embodiment of a door handle 100 according to the present teachings. As shown in FIG. 1A, the door handle 100 may have a crescent or elongated shape, although not limited thereto. In this way, it may be tapered (e.g., crescent shaped, etc.) to inhibit a person from hanging a ligature or some other material on the door handle 100 in order to hang him- or herself. The door handle 100 may be constructed from any number of materials including lightweight, solid bronze, although not limited thereto. It is preferably constructed with a material that provides institutional strength and durability.

The door handle 100 may be easily installed on existing doors, in order to retrofit them, by being designed for use with full-size mortise locks, although not limited thereto. The elongated member of the door handle 100 is preferably constructed without an opening. This way, a ligature cannot be passed through the door handle 100 for affixing thereto. However, it may have an indented portion to enable a user to easily pull a door open. The door handle 100 and plate 110 may be fastened substantially close with a door 108 such that there is only a minute space therebetween. This inhibits a person from slipping a ligature between the door handle 100 and the door 108.

The door handle 100 may be in pivotal connection with a plate 110 member, although not limited thereto. The plate member 110 and the door handle 100 may be substantially close to one another to inhibit a ligature from being inserted therebetween. The door handle 100 may have a pivot point 102 so that pivoting the door handle 100 about one end may operate a latch bolt, dead bolt, or some other mechanism for locking or otherwise securing a door. It is appreciated that the pivot point 102 could be anywhere on the door handle 100 and it is not limited to its end. However, positioning the pivot point 102 substantially near its end helps secure the door handle 100 and may inhibit a person from slipping a ligature between the door handle 100 and the plate 110 at that end.

The door handle 100 may also have a toe 104 which interacts with a retaining member on the plate 110 such as a toe track 106, although not limited thereto. The toe 104 may be situated on the end of door handle 100 opposite from the pivot point 102, although not limited thereto. This allows for pivoting of the door handle 100 at the pivot point 102, while at the same time helping retain the door handle 100. The toe track 106 may retain the toe 104 of the door handle 100 by inhibiting it from being pivoted farther than the toe track 106 permits. In one embodiment, the toe of the door handle 100 may comprise one or more protrusions which may further retain the toe 104 of the door handle 100 and inhibiting it from being pulled away from the toe track 106. This may inhibit it from being dislodged from the door by force so as to loop or tie a ligature around it.

Since the door handle 100 may be coupled with the plate substantially near each of its ends (e.g., pivot point and toe), a person attempting suicide is unable to slip a ligature between the door handle 100 and the plate 110 in order to hang him- or herself. The two connections also make it difficult for a person to break the door handle 100 off of the plate and away from the door, either to use it as a weapon, to cause damage to the door, or for some other reason.

The door handle 100 may further have a lock mechanism adapted for receiving a key, although not limited thereto. In this way, with the use of a key a user may lock the door handle 100 to secure a door.

Referring now to FIGS. 1B and 1C, it is appreciated that the door handle 100 may be sized to suit any particular needs. In one embodiment, its depth D may be substantially between 1⅛" and 3⅛", and preferably substantially around 2⅛", while its height H may be substantially between 6½" and 8½", and preferably substantially around 7½". It is appreciated that the door handle 100 may be constructed in any size and in any number of shapes to achieve its desired objectives and the present teachings are not limited to this particular embodiment.

Referring now to FIG. 1C, to operate the door handle 100 a user may pivot the door handle 100 about its pivot point 102 to actuate a latch bolt, dead bolt, or some other locking mechanism, and open the door 108, although not limited thereto. The pivot point 102 and toe 104 interacting with the toe track 106 assure that the door handle 100 remains secured to the door 108.

The large surface area of the door handle 100 provides an easy way to operate the door handle 100 even for users with disabilities. The design may be compliant with the Americans with Disabilities Act (ADA) by providing handicap accessibility such that one-handed operation of the door handle 100 will not require tight grasping, tight pinching or twisting of the wrist, although not limited thereto. A door handle 100 so constructed may be useful in, for example, although not limited thereto, psychiatric institutions or other facilities where patient safety is an issue. The door handle 100 is designed to easily operate a door while at the same time being anti-ligature (e.g., inhibiting looping or tying) to impede the possibility of a patient hanging himself or herself.

Figure 2A:
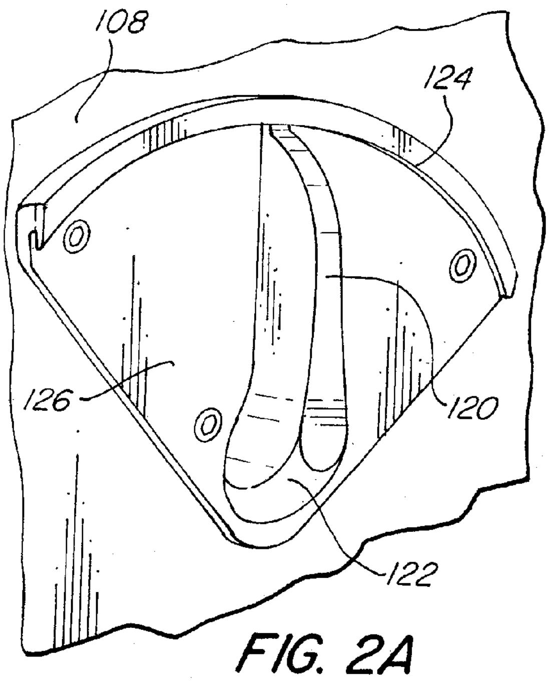
FIGS. 2A, 2B and 2C are illustrations of one embodiment of a thumb turn according to the present teachings.
Figure 2B:
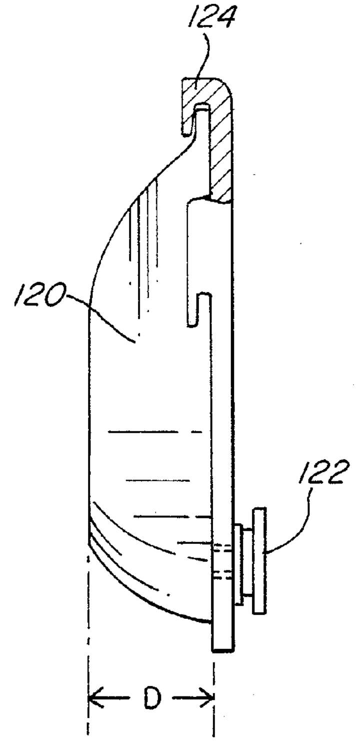
Figure 2C:
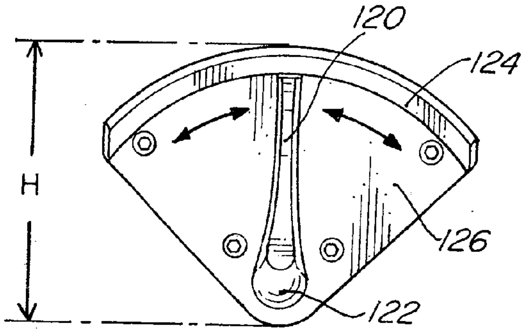

Referring now to FIGS. 2A, 2B and 2C, shown are illustrations of one embodiment of a thumb turn 120 according to the present teachings. As shown in FIG. 2A, similar to the design of the door handle 100 (shown in FIG. 1), the thumb turn 120 may have a pivot point 122 at one end, although not limited thereto, which is in pivotal connection with a plate 126 member. The thumb turn 120 and plate 126 member may be substantially close to one another to inhibit a ligature from being inserted therebetween. Further, the plate 126 member may be fasted substantially close to a door 108 to inhibit a ligature from being inserted therebetween.

On the end of the thumb turn 120 opposite from the pivot point 122, although not limited thereto, there may be a retaining member on the plate 126 such as a railing 124, although not limited thereto. The railing 124 may be adjacent to the thumb turn 120 in order to retain it in place, although not limited thereto. If the railing 124 is substantially close with the thumb turn 120, it may inhibit someone from inserting a ligature therebetween. In one embodiment, the railing 124 may partially overlap the thumb turn 120 to further retain it in place and inhibit it from being dislodged.

Since the thumb turn 120 may be coupled with the plate substantially near each of its ends (e.g., pivot point and railing), a person attempting suicide is unable to slip a ligature between the thumb turn 120 and the plate 126 in order to hang him- or herself.

The thumb turn 120 may further have a lock mechanism adapted for receiving a key, although not limited thereto. In this way, with the use of a key a user may lock the thumb turn 120 to secure a door, although not limited thereto.

Referring now to FIGS. 2B and 2C, it is appreciated that the thumb turn 120 may be sized according to any particular need. In one embodiment, although not limited thereto, its depth D may be substantially between 5⁄16" and 1⅛", and preferably substantially around 13⁄16", while its height H may be substantially between 2½" and 4½", and preferably substantially around 3½". It is appreciated that the thumb turn 120 may be constructed in any size and in any number of shapes so that it achieves the desired objectives. It may be easily installed on existing doors, in order to retrofit them, by being designed for use with full-size mortise locks, although not limited thereto. The thumb turn 120 may be used by itself in order to secure a door 108 or in combination with the door handle 100, although not limited thereto.

Referring now to FIG. 2C, in operation a user may easily pivot the thumb turn 120 about its pivot point 122. The thumb turn 120 may provide a suitable surface area with which to easily operate a latch bolt, dead bolt, or some other mechanism for securing a door 108, although not limited thereto. Although it is referred to as a "thumb" turn, it is appreciated that any single finger, multiple fingers, or any other body part or apparatus can easily operate the thumb turn 120. In this way it provides easy operation, which may be helpful for users with disabilities, while at the same time thwarting suicide attempts.

Figure 3:
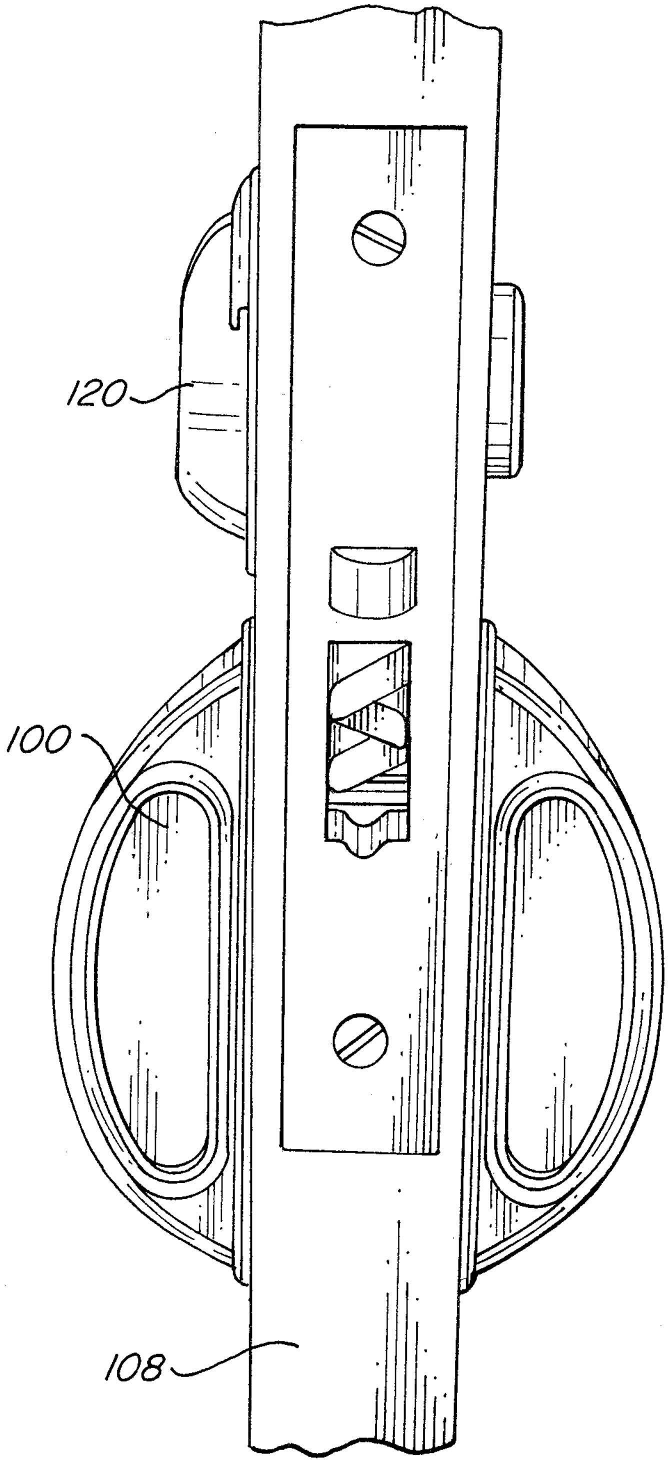
FIG. 3 is a perspective view of embodiments of the door handle and thumb turn employed on a door.

Referring now to FIG. 3, shown is a perspective view of embodiments of the door handle 100 and thumb turn 120 employed on a door 108. This illustrates how the two devices may be employed simultaneously to provide both the benefits of privacy and security, as well as anti-ligature characteristics and ease of operation.

Figure 4A:
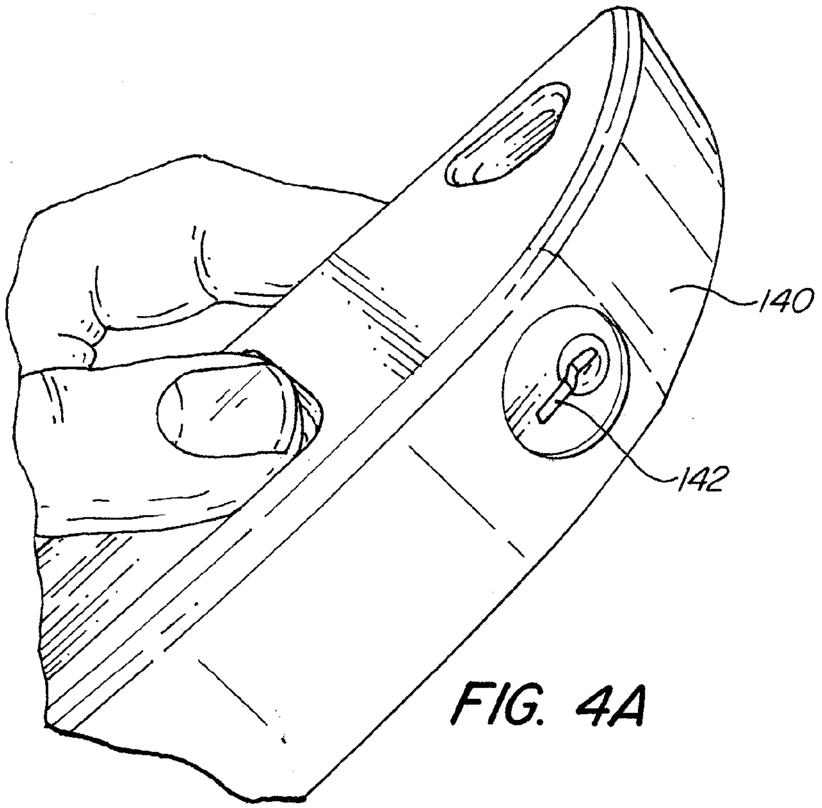
FIGS. 4A and 4B are illustrations of another embodiment of a door handle having a lock mechanism according to the present teachings.
Figure 4B:
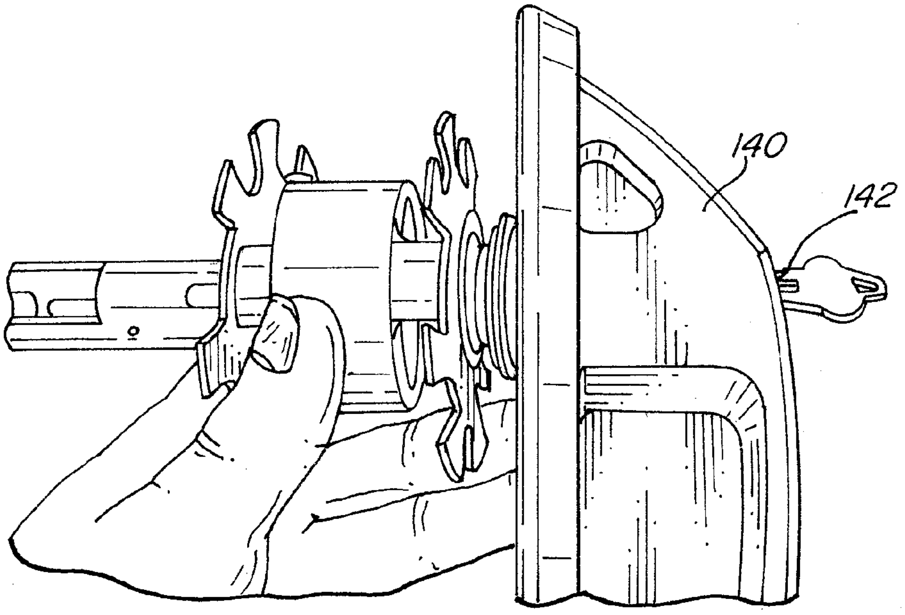

Referring now to FIGS. 4A and 4B, shown are illustrations of another embodiment of a door handle 140 having a lock 142 according to the present teachings. In this embodiment, the door handle 140 is adapted for use with a cylindrical lock as opposed a mortise lock (as shown in FIG. 1). "Mortise lock" typically refers to a lock that requires a pocket (or mortise) to be cut into the door into which the lock is to be fitted. A cylindrical lock, on the other hand, is one in which two holes are bored perpendicular to one another into the door; a large hole is bored into the door face and a smaller cross bore hole is bored into the door edge. It is appreciated that the present teachings could be adapted for any number of different types of locks and they are not limited to these particular embodiments.

In operation, the entire door handle 140 housing may rotate as a single unit upon an escutcheon plate (an ornamental or protective plate, not shown) surrounding the door hole. The lock 142 may require a key in order to secure a door. It is appreciated that any form of locking mechanism may be employed on this or any embodiment of the door handle or thumb turn according to the present teachings.

Figure 5:
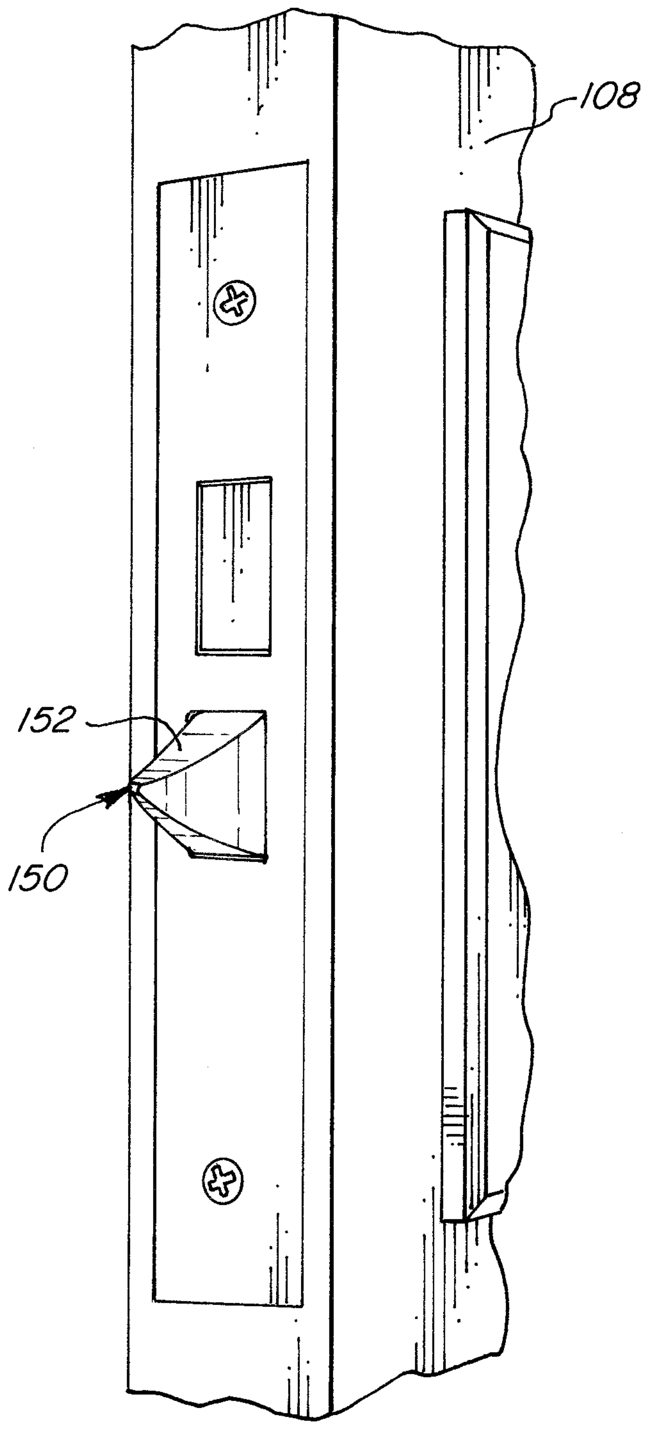
FIG. 5 is a perspective view of one embodiment of a beveled latch according to the present teachings.

Referring now to FIG. 5, shown is a perspective view of one embodiment of a beveled latch 150 according to the present teachings. The beveled latch 150 (e.g., locking mechanism, latch bolt, dead bolt, etc.) may have a bevel 152 (e.g., tapered edges, etc.) on its top, its bottom, or both (as shown), although not limited thereto, to inhibit its use as a potential ligature point. With traditional latches, the top and bottom of the latch are typically flat. People have been known to insert a ligature (e.g., a sheet with a knot on the end, etc.) between the door 108 and the door jamb (not shown), above the traditional latch. In such a case, the traditional latch restrains the ligature at a height suitable for hanging oneself with the free end of the ligature.

With the beveled latch 150 according to the present teachings, however, the bevel 152 causes the latch to release upon downward or upward (if bottom bevel) pressure. In this way, if a person places a ligature between the door 108 and door jamb above the beveled latch 150, for example, and then puts downward pressure on the ligature in order to hang him- or herself, the pressure of the ligature on the bevel 152 causes the beveled latch 150 to withdraw. This releases the door 108, freeing any ligature and inhibiting the suicide attempt.

The beveled latch 150 may also be used with a dead bolt in applications where security is preferable. In such a case, it may be preferable that the deadbolt can only be deployed by authorized personnel, such as with a key, although not limited thereto.

While the present teachings have been described above in terms of specific embodiments, it is to be understood that they are not limited to these disclosed embodiments. Although institutions and doors have been discussed, anywhere a lock or apparatus for opening a door is desirable is a potential application for the present teachings and they are not limited to these particular embodiments. Many modifications and other embodiments will come to mind to those skilled in the art to which this pertains, and which are intended to be and are covered by both this disclosure and the appended claims. It is intended that the scope of the present teachings should be determined by proper interpretation and construction of the appended claims and their legal equivalents, as understood by those of skill in the art relying upon the disclosure in this specification and the attached drawings.

What is claimed is:

1. Door hardware, comprising:

an elongated member having a first end, a second end, and a pivot point substantially near its first end; and a plate member in pivotal connection with the pivot point of the elongated member such that the plate member and elongated member are substantially close to one another to inhibit a ligature from being inserted therebetween, the plate member having a retaining member adjacent to the elongated member;

wherein the plate member is adapted for fastening substantially close to a face of a door to inhibit a ligature from being inserted therebetween;

wherein the door hardware is operable by pivoting the elongated member about its pivot point to operate a locking mechanism, the pivoting crossing from one side of a vertical plane of the door to its other side, the vertical plane perpendicular to the face of the door; and wherein the elongated member has a tapered profile to inhibit ligatures from hanging thereon;

whereby the pivotal connection between the elongated member and the plate member and the retaining member adjacent to the elongated member inhibit ligatures from being slipped between the elongated member and the plate member.

2. The door hardware of claim 1, wherein the second end of the elongated member further comprises a toe; the retaining member of the plate member comprises a toe track; and the toe is at least partially disposed in the toe track.

3. The door hardware of claim 2, wherein the toe further comprises protrusions that retain the toe in the toe track.

4. The door hardware of claim 1, wherein the retaining member of the plate member comprises a railing adjacent to the second end of the elongated member.

5. The door hardware of claim 4, wherein the railing at least partially overlaps the second end of the elongated member.

6. The door hardware of claim 1, wherein the locking mechanism comprises a latch with a bevel on its top.

7. A door handle, comprising:

an elongated member having a first end, a second end, a pivot point substantially near its first end, and a toe substantially near its second end; and a plate member in pivotal connection with the pivot point of the elongated member such that the plate member and elongated member are substantially close to one another to inhibit a ligature from being inserted therebetween, the plate member having a toe track adapted for receiving the toe of the elongated member;

wherein the plate member is adapted for fastening substantially close to a face of a door to inhibit a ligature from being inserted therebetween;

wherein the door handle is operable by pivoting the elongated member about its pivot point to operate a locking mechanism, the pivoting crossing from one side of a vertical plane of the door to its other side, the vertical plane perpendicular to the face of the door;

wherein the elongated member has a tapered profile to inhibit ligatures from hanging thereon; and wherein the toe track comprises an opening in the plate member for receiving the toe, the toe generally perpendicular to that plate member such that the toe is disposed in the opening.

8. The door handle of claim 7, wherein the elongated member further comprises indentations to assist a user in grasping the door handle.

9. The door handle of claim 7, wherein the toe further comprises a plurality of protrusions that retain the toe in the toe track.

10. The door handle of claim 7, further comprising a door, wherein the door handle is fastened to the door.

11. The door handle of claim 7, wherein the door handle is adapted for use with mortise locks.

12. The door handle of claim 7, wherein the door handle is adapted for operating a latch bolt.

13. The door handle of claim 7, further comprising a lock adapted for receiving a key and locking the door handle.

14. The door handle of claim 7, wherein the locking mechanism comprises a latch with a bevel on its top.

15. A thumb turn, comprising:

an elongated member having a first end, a second end, and a pivot point substantially near its first end;

a plate member in pivotal connection with the pivot point of the elongated member such that the plate member and elongated member are substantially close to one another to inhibit a ligature from being inserted therebetween, the plate member having a retaining member adjacent to the second end of the elongated member;

wherein the plate member is adapted for fastening substantially close to a face of a door to inhibit a ligature from being inserted therebetween;

wherein the thumb turn is operable by pivoting the elongated member about its pivot point to operate a locking mechanism, the pivoting crossing from one side of a vertical plane of the door to its other side, the vertical plane perpendicular to the face of the door;

wherein the elongated member has a tapered profile to inhibit ligatures from hanging thereon; and wherein the thumb turn operates a dead bolt;

whereby the pivotal connection between the elongated member and the plate member and the retaining member adjacent to the elongated member inhibit ligatures from being slipped between the elongated member and the plate member.

16. The thumb turn of claim 15, further comprising a door, wherein the thumb turn is fastened to the door.

17. The thumb turn of claim 15, further comprising a lock adapted for receiving a key and locking the thumb turn.

18. A door handle, comprising:

an elongated member having a first end and a pivot point substantially near its first end; and a lock adapted for receiving a key;

wherein the elongated member is adapted for fastening substantially close to a face of a door to inhibit a ligature from being inserted therebetween;

wherein the door handle is operable by pivoting the elongated member about its pivot point to operate a locking mechanism, the pivoting crossing from one side of a vertical plane of the door to its other side, the vertical plane perpendicular to the face of the door;

wherein the lock is adapted for locking the door handle; and wherein the elongated member has a tapered profile to inhibit ligatures from hanging thereon.

19. The door handle of claim 18, wherein the elongated member further comprises indentations to assist a user in grasping the door handle.

20. The door handle of claim 18, further comprising a door, wherein the door handle is fastened to the door.

21. The door handle of claim 18, wherein the door handle is adapted for use with cylindrical locks.

22. The door handle of claim 18, wherein the door handle is adapted for operating a latch bolt.

23. The door handle of claim 18, wherein the locking mechanism comprises a latch with a bevel on its top.

24. The door hardware of claim 1, wherein the retaining member retains the elongated member.

25. The door hardware of claim 24, wherein the retaining member retains the elongated member at its second end.

26. The door hardware of claim 1, wherein the retaining member at least partially overlaps a portion of the elongated member.

27. The door hardware of claim 26, wherein the retaining member overlaps a portion of the elongated member along a length of the elongated member.

28. The thumb turn of claim 15, wherein the retaining member comprises a railing.

29. The thumb turn of claim 15, wherein the elongated member comprises a toe substantially near its second end, wherein the retaining member comprises a toe track, and wherein the toe is at least partially disposed in the toe track.

30. The thumb turn of claim 29, wherein the toe further comprises protrusions that retain the toe in the toe track.

31. The thumb turn of claim 15, wherein the dead bolt is beveled.

32. The door hardware of claim 1, wherein the locking mechanism is unlocked by pivoting the elongated member in either direction across the vertical plane.

33. The door hardware of claim 1, wherein the locking mechanism is in a locked position when the elongated member is substantially parallel with the vertical plane.

* * * * *